United States Patent Office 3,500,890
Patented Mar. 17, 1970

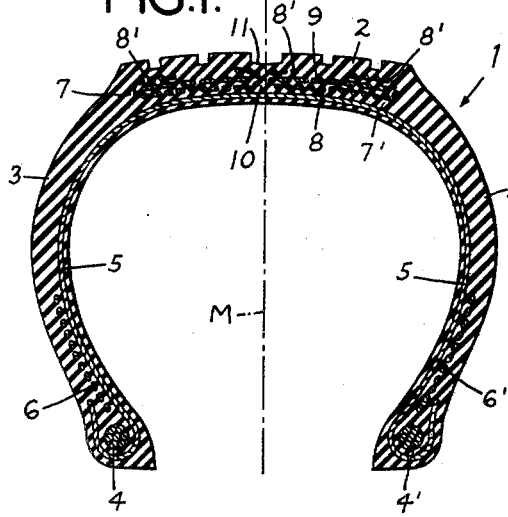
FIG.1.
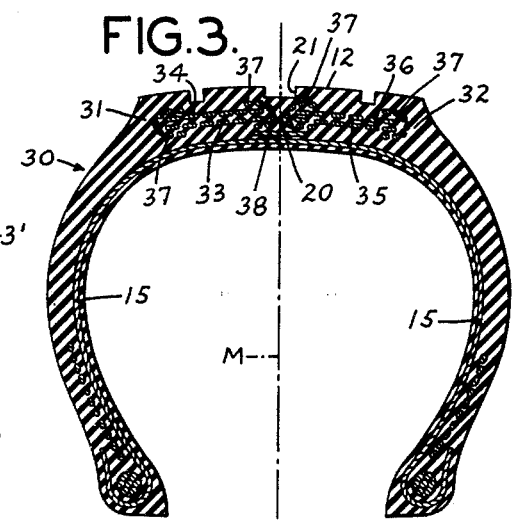
FIG.3.
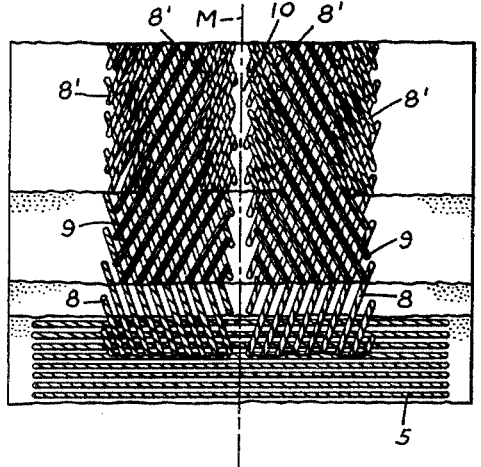
FIG.2.
FIG.4.
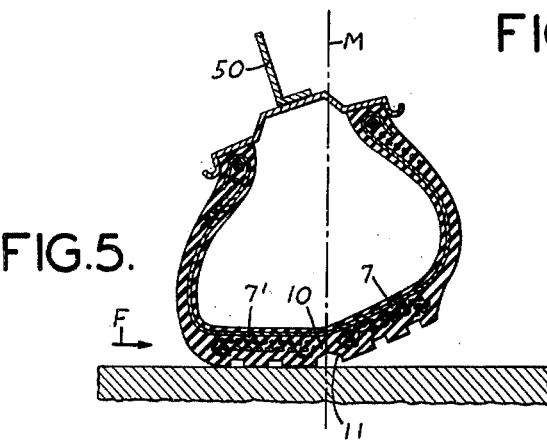
FIG.5.
INVENTOR
JACQUES BOILEAU
BY
HIS ATTORNEYS

3,500,890
RADIAL PLY TIRES
Jacques Boileau, Clermont-Ferrand, France, assignor to Compagnie Generale des Etablissements Michelin, raison sociale Michelin & Cie, Clermont-Ferrand, France
Filed July 24, 1967, Ser. No. 655,576
Claims priority, application France, Aug. 1, 1966, 71,703
Int. Cl. B60c 9/06
U.S. Cl. 152—361                                  8 Claims

ABSTRACT OF THE DISCLOSURE

A radial ply tire in which the tread contains separate circumferential tread reinforcements arranged in side by side relation and spanning the tread and providing a narrow zone therebetween imparting increased flexibility to the tire in a radial direction and articulating the tread reinforcements on opposite sides of the median plane of the tire so that they can flex independently when subjected to stresses to enhance the road-holding ability and riding comfort of the tire.

---

The present invention relates to improvements in pneumatic tires or tire casings, and more particularly to improvements in the tread reinforcements of radial ply tires.

Radial ply tires are provided with a tread reinforcement extending beneath the entire width of the tread and serving to stiffen the tread and thereby prevent parasitic movements which generate wear and tear and slipping as well as consumption of energy, and reduce deformation of the tread which result in drifting and directional deviation. These advantages are enhanced with a peak reinforcement which is stiffer in a direction parallel to the surface of rolling, which explains the importance and the success of steel wire tread reinforcements, especially when high-level performance is required.

However, a tread reinforcement which is too stiff has certain disadvantages and thus stiffness should not be exaggerated. In particular, a tread reinforcement which is too stiff may reduce comfort, especially at low speeds and over certain kinds of ground, in spite of the use of a carcass which is very flexible due to the radial direction of the wires or cords composing it. The comfort factor limits the amount the sidewall can be stiffened to improve the stability of the tire while travelling in a straight line. Likewise, a radial tire with a very stiff tread reinforcement may suddenly lose road-adherence at maximum drift conditions. A tread which is heavily reinforced deforms comparatively little in transverse direction and when sharp curves are taken too rapidly, the tread which may be in full engagement with the road may completely lose road contact without warning.

An object of the present invention is to overcome the above-mentioned disadvantages and to provide for a tread reinforcement which, while being stiff, provides better comfort and improved running behavior.

In accordance with the invention, the new tire has a tread reinforcement which is interrupted at a narrow zone substantially equidistant from the two shoulders of the tread to form two sections having specially reinforced edges in side-by-side relation thereby providing a tread articulated in the middle and reinforced on either side of the articulation and in the region of the shoulders of the tire. The articulation must be in the vicinity of the median plane which is the zone of the tread under the least stress.

The edges of the tread reinforcement sections may be strengthened, for example, by an additional layer of wires or cords to prevent premature rupture or failure in the center zone which has no tread reinforcement and is protected mainly by the carcass. The added layer assures a stronger attachment of the tread reinforcements to the carcass and eases strains, especially at the zone of the interruption of the tread reinforcement, thereby making possible the interruption in the tread reinforcement. The reinforcement of the edges of the tread plies improves both the connection with the carcass and the radial flexibility of the tread zone of the tire for the reason that the space between the edges of the tread reinforcements has greater flexibility than the remainder of the tread.

In one embodiment of the invention, each of the juxtaposed peak reinforcements includes at least one ply having its edges folded back around the edges of one or more additional plies in the reinforcement. In a modification, each of the reinforcements may include several superimposed plies, the edges of which are enclosed in plies folded into a U-shaped cross-section. Each tread reinforcement may be of the type disclosed in U.S. application Ser. No. 514,004 filed Dec. 15, 1965 and Ser. No. 514,005 filed Dec. 15, 1965 except that in the present case two juxtaposed tread reinforcements are provided instead of a single tread reinforcement.

In another embodiment of the invention, the tread is provided with a circumferential groove substantially in alignment with the space between the two sections of the tread reinforcement. By reducing the thickness of the tread covering the carcass between the two tread reinforcements, one-half of the tread can move more freely relative to the other half. Reduction of the reinforcement of the tread in the center zone is possible for the reason that the tread is subject to less strain in the center than at the edges.

The two stiff tread zones are connected essentially by means of the carcass and the rubber in the tire between the carcass and tread and between the tread reinforcements. However, a connecting ply spanning the space between the two reinforcements may be included in the tread, the connecting ply having a width double or triple the width of the spacing between the two reinforcements and being placed either above or below the tread reinforcements. Advantageously, the cords of the connecting ply are directed parallel to the cords of the carcass.

The two peak reinforcements may be of identical construction and width and may be arranged symmetrically in relation to the median plane, with a spacing corresponding, for example, to one-tenth to one-twentieth of the width of the tread, or as little as the thickness of a wire or cord. The two reinforcements may likewise be symmetrical in structure in relation to the median plane with each angle of a ply constituting a reinforcement having a corresponding angle in the corresponding ply of the other reinforcement. However, the double reinforcement may be modified to provide an asymmetric structure, for example, by constructing two reinforcements of different widths or by having the spacing or gap between them in off-center relation to the median plane. The preferred form of tire has two reinforcements of the same width and arranged symmetrically in relation to the median plane and asymmetry will be provided by arranging the cords forming the reinforcements so that they are inclined at different angles to the median plane of the tire or by using different materials in the two tread reinforcements.

The replacement of a single reinforcement extending over the entire width of the tread by two juxtaposed peak reinforcements having widths close to half the width of the tread renders the tread considerably more flexible in the radial direction. The impact caused by an obstacle placed on the ground and having a width attaining as much as one-half of the width of the tread will be diminished due to the fact that only one of the reinforcements will be directly affected by the impact strain while the other reinforcement will maintain normal contact with the ground, or due to the fact that the two reinforcements will pivot towards the interior of the tire while preserving normal contact on the ground over the two edges of the tread. On the other hand, if the transverse or longitudinal stresses exerted on the reinforcement of the tread are equally distributed between the two sections, the sections will resist deformation as strongly as a single reinforcement of double width. Thus, rigidity in a direction parallel to the surface of rolling is preserved and radial flexibility is improved. The division of the reinforcement also facilitates a progressive change in road-adherence under severe operating conditions, for example, stresses produced by negotiating a curve at high speed may cause one-half of the tread to lose road adherence before the other half loses road adherence so that loss of adherence will be gradual or at least will be effected in two stages, giving the driver warning before vehicle control is lost.

The division of the tread reinforcement into two sections also has the advantage of offering better facilities for adapting each of the sections to the different stresses to which the inside and the outside of a tire mounted on an automotive vehicle are subjected. The tire in accordance with the invention behaves in a manner similar to that of dual tires of identical or different characteristics and is equal to two tires of lesser width joined permanently.

For a better understanding of the invention, reference may be had to the accompanying drawings, wherein:

FIGURE 1 is a radial cross-sectional view of a tire cover embodying the invention;

FIGURE 2 is a plan view broken away to show the arrangement of the cords of the reinforcement shown in FIGURE 1;

FIGURES 3 and 4 are views, respectively corresponding to FIGURES 1 and 2, of another embodiment of the invention; and FIGURE 5 is a radial cross-sectional view of a tire embodying the invention mounted on a vehicle wheel subjected to an extreme lateral thrust.

The tire 1 shown in FIGURES 1 and 2 comprises a tread 2, the sidewalls 3 and 3' on either side of the tread, ending in the beads containing the usual bead wires 4 and 4'. A ply of cords 5 disposed in radial planes constitutes the carcass of the tire and has its edges folded back around each of the bead wires 4 and 4'. The portion of the sidewalls 3 and 3' between the bead wires and approximately mid-height of each sidewall is reinforced with a ply of non-radial cords 6 and 6'.

Between the tread 2 and the carcass ply 5 located underneath it is a tread reinforcement divided into two sections 7 and 7' which are symmetrical with each other in relation to the longitudinal median plane M of the tire. Each of these sections has a width which is slightly less than one-half of the width of the tread 2 and comprises a very elastic cord ply 8, for example, consisting of steel, forming an angle of 18° with the plane M, and a cord ply 9, consisting in this example likewise of steel, and forming with the median plane an angle of 25° in a direction opposite to that of the angle of the cords 8. In order to stiffen the edges of each of the sections, the edges 8' of the ply 8 are folded above the edges of the ply 9. The space 10 between the section 7 and the section 7' is very small, that is, approximately three millimeters. In addition to the customary tread grooves, the tread 2 has a circumferential center groove 11 which is comparatively wide and located in the median plane M, thus aligned with the space 10 between the reinforcement sections 7 and 7'. The center groove 11 and the space 10 in cooperation form an articulation between the two halves of the tread.

A modified tire 30 containing the tread reinforcement is shown in FIGURE 3, and for the sake of clarity, FIGURE 4 shows only a single cord of each of the different plies of cords constituting the reinforcement of this tire.

In this modification, the carcass is formed of radial cords 15 extending from one bead wire to the other bead wire. The tread 12 has a comparatively wide center groove 21 located in the longitudinal median plane M concentric with the space 20 between the two sections 31 and 32 of the tread. The groove 21 and space between the sections render the zone of the tire between the two halves of the tread flexible and hinge-like. In this example, the space 20 is a little wider than in the tire illustrated by FIGURE 1, and may be, for example, five millimeters wide. The reinforcing section 31 has a structure different from that of section 32 in that the cords of its main plies do not form the same angles with the median plane M. The section 31 comprises a ply 33 of cords forming with the median plane an angle of 25° to the right and is covered by a ply 34 of cords directed towards the left at an angle of 18° with relation to the plane M. The section 32 contains a ply 35 of cords forming with the plane M at an angle of 17° to the left and it is covered by a ply 36 of cords directed towards the right at an angle of 17° too. Although the asymmetry between the sections 31 and 32 caused by their different angles does not appear very great in FIGURE 4, it is nevertheless sufficient for the two sections to behave in different manners when the tire rolls.

The edges of the plies 33 and 34 as well as 35 and 36 are enclosed with folded narrow plies 37 consisting of polyamide fibers or other elastomer fibers having a Shore A hardness of at least 70° forming an angle of 15° with the plane M. In order to relieve the carcass cords 15 in the zone of the joint 20, a ply of transverse cords 38 is placed underneath this zone and extends in this example over a width of approximately fifteen millimeters. The cords of the ply 38 can be inclined at an angle relative to forming with the plane M as small as 40°.

FIGURE 5 illustrates the deformation of the tire shown in FIGURES 1 and 2 when the wheel 50 on which it is mounted tilts with the vehicle under the effect of a transverse force such as F, for example, centrifugal force. Due to the articulation in the zone 10, half of the tread with its reinforcement section 7 which is lifted from the ground does not affect the other half of the reinforcement section 7' so that half of the tread equipped with an independent reinforcement 7', remains in full contact with the ground and maintains good road-holding ability.

It is possible to modify the tires described above without departing from the invention. Thus, for example, the ply 8 (FIGURE 1) can be located above the ply 9 and its folded-back edges 8' can be located underneath the latter. Furthermore, the stiffening of the edges of the reinforcement sections may be obtained by means, known in itself, other than plies of cords, for example, by narrow bands of hard elastomer or metal, etc. Finally, the cords constituting the different plies of the reinforcement may consist of natural, artificial or synthetic textile fibers, metal, glass, etc., and may be used in the form of single wires, twists, strands, plaits, etc.

Accordingly, it should be understood that the embodiments of the invention described above are illustrative of the invention defined in the following claims.

I claim:

1. A radial ply tire having a tread, sidewalls and beads and a reinforcement for said tread comprising two spaced-apart circumferentially extending reinforcement sections each containing at least two plies of cords beneath said tread, said plies collectively substantially spanning said tread and having opposed inner edges spaced apart a small distance transversely of said tread and forming an articulation, and means reinforcing the inner and outer edges of at least one of said plies in each of said reinforcement sections, there being more superimposed layers of cords in each edge of each section than in the central portion of each section.

2. The tire set forth in claim 1 wherein the tread has a circumferential groove outwardly of and substantially in alignment with said spaced inner edges of said plies.

3. The tire set forth in claim 1 comprising a narrow ply in said tread overlapping the spaced-apart inner edges of said reinforcement sections, said narrow ply having a width between about two and four times the spacing between said inner edges of said plies.

4. The tire set forth in claim 3 in which said narrow ply comprises cords inclined at an angle of from approximately 40° to approximately 90° relative to the circumferential direction of the tread.

5. The tire set forth in claim 1 in which said means for reinforcing said edges of said one ply of each reinforcement section comprises edges of another ply in each of said reinforcement sections folded around the edges of said one ply.

6. The tire set forth in claim 1 in which said means for reinforcing the edges of said one ply of each reinforcement section comprises narrow plies folded around and enveloping the edges of said one ply.

7. A radial ply tire having a tread, sidewalls and beads and a reinforcement for said tread comprising two spaced-apart circumferentially extending reinforcement sections each containing at least one ply of cords beneath said tread, said plies substantially spanning said tread and having opposed inner edges spaced apart transversely of said tread, means reinforcing the inner and outer edges of said plies, a narrow ply in said tread overlapping the spaced-apart inner edges of said reinforcement sections, said narrow ply having a width between about two and four times the spacing between said inner edges of said plies, said narrow ply being composed of an elastomer of at least 70° Shore A hardness.

8. A radial ply tire having a tread, sidewalls and beads and a reinforcement for said tread comprising two spaced-apart circumferentially extending reinforcement sections each containing at least one ply of cords beneath said tread, said plies substantially spanning said tread and having opposed inner edges spaced apart transversely of said tread, and means reinforcing the inner and outer edges of said plies, said two reinforcement sections being asymmetrical in relation to the longitudinal median plane of the cover.

References Cited

UNITED STATES PATENTS 3,357,470  12/1967  Massoubre _____ 152—361

ARTHUR L. LA POINT, Primary Examiner

C. B. LYON, Assistant Examiner

U.S. Cl. X.R.

152—354